3,223,470
PROCESS FOR THE PREPARATION OF DYEINGS AND PRINTS WHICH ARE FAST TO WET PROCESSING
Hermann Boedeker, Frankfurt am Main, Gerhard Langbein, Hofheim, Taunus, Karl Sommer, Konigstein, Taunus, Hans Zimmermann, Hofheim, Taunus, and Klaus Berner, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 1, 1962, Ser. No. 191,439
Claims priority, application Germany, May 6, 1961, F 33,866
5 Claims. (Cl. 8—39)

The present invention provides a process for the preparation of dyeings and prints which are fast to wet processing.

We have found that fast dyeings and prints can be produced on various fibrous materials, for example such as natural or regenerated cellulose fibers, wool, silk or polyamide fibers, by applying to the fibrous material water soluble dyestuffs which contain the grouping

and at least one of the groupings

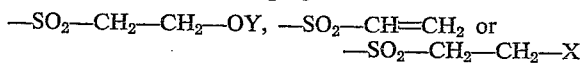

in which X represents a halogen atom and Y represents the radical of a polybasic acid, and by fixing the dyestuffs at normal or raised temperature in the presence of agents giving an alkaline reaction. As polybasic acids the radical of which is represented by Y there are used, for example, sulfuric acid, phosphoric acid, boric acid, benzene- or naphthalene-polysulfonic acids, or benzene- or naphthalene-polycarboxylic acids. The fixation of the dyestuffs can be carried out within a large temperature range, suitably between about 18° C. and about 130° C.

As dyestuffs of the type mentioned which may contain groups imparting solubility in water such as, for example, the sulfonic acid-, carboxylic acid- or sulfonic acid-amide group, various dyestuffs may be used, for example azo-dyestuffs and the complex metal compounds thereof such as the copper, cobalt, and chromium compounds, furthermore anthraquinone dyestuffs, phthalocyanine dyestuffs as well as the complex metal compounds thereof such as the copper and nickel compounds, dioxazine, azine, triphenylmethane and stilbene dyestuffs. They may be prepared for example in such a manner that 1 mol of cyanuric chloride is first reacted with 1 mol of an amino-aryl-β-hydroxyethylsulfone or the sulfuric acid ester thereof, an aminoaryl-vinylsulfone or an aminoaryl-β-chloro-ethylsulfone, and then with 1 mol of a dyestuff containing an amino group which can be acylated. When using an aminoaryl-β-hydroxyethylsulfone, the dyestuff obtained must subsequently be converted into the mono-ester of a polybasic acid. If azo-dyestuffs are used, it is also possible to react the first-formed condensation product with 1 mol of a diazo component or of a coupling component containing an amino group which can be acylated and which is not necessary for the diazotization or coupling. The corresponding dyestuffs are subsequently prepared by reaction with a coupling component or with a diazo component respectively.

The condensation of the components with cyanuric chloride may also be conducted in a different order. It is equally possible to condense 1 mol of cyanuric chloride, dichloropyrimidine or trichloropyrimidine with, for example, 2 mols of a coupling component containing an amino group which can be acylated and then to couple the condensation products with diazotized aminoaryl-β-hydroxyethylsulfonic acid esters, aminoaryl - β - chloroethylsulfones or aminoaryl-vinylsulfones, or to condense cyanuric chloride with amine dyestuffs already containing a β - hydroxyethylsulfonic acid ester-, β - chloro - ethylsulfone- or vinylsulfone-group. The dyestuffs may also be metallized subsequently. With the above-mentioned manufacturing processes, the possibilities are not exhausted.

The novel process can be conducted, for example, according to the direct dyeing method by dyeing the dyestuff with the addition of alkaline agents, if desired in the presence of electrolytes, in a long liquor and, if necessary, fixing by gradually raising the temperature of the bath. If there exists no or no pronounced affiinity to the fiber, it is advantageous to work with the aid of a continuous dyeing process, for example by padding cellulose fiber with a solution of the dyestuff and then, suitably after intermediate drying, passing this cellulose fiber through a bath containing an alkaline agent or an agent yielding alkali such as, for example, sodium hydroxide, sodium carbonate, sodium bicarbonate, trisodium phosphate, the sodium salt of trichloroacetic acid or the corresponding potassium or alkaline earth metal compounds, whereupon the dyestuff—after having once more been dried—is fixed by steaming or dry heating. The alkaline agent may also be added to the padding liquor, which saves one process step. It is also possible to pad the fiber first with the solution of an alkaline agent and then with the dyestuff solution and to fix it in the manner described above.

If the impregnation of the fibrous material is carried out, for example, in the presence of an alkali hydroxide, fixation of the dyestuffs can also be conducted in the cold or at a moderately elevated temperature according to the so-called pad batch process by allowing the impregnated fibrous material to stand for several hours.

For printing it is advantageous to apply the dyestuff to the fiber together with a thickening agent, for example, sodium alginate, methyl cellulose, starch ether or an emulsion thickening and one of the alkaline agents described above, if desired with the addition of the usual printing auxiliaries as for example urea or a dispersing agent, to dry the material and to subject it to a heat reatment, preferably in the presence of steam.

It is also possible to apply a printing paste containing no alkali but only dyestuff, thickening agent and printing auxiliaries to a material prepared with alkali. After drying these prints, fixation is carried out by the usual heat treatment, for example in a steamer.

Furthermore, such a printing paste containing no alkali may be printed onto a material which has not been prepared with alkali. After drying, the printed material is passed through a padding liquor containing alkali and, if desired electrolytes such as, for example, sodium chloride, or it is padded with a correspondingly thickened solution. The fixation of the dyestuffs is then carried out by an immediately following heat treatment of the material, for example in a rapid ager, in an electro fixer, in a tenter frame or in the wet state at raised temperature, for example by a short passage through a salt bath. Furthermore, fixation may be attained in such a manner that the printed material is not passed through a cold padding liquor but through a hot padding liquor, for example at temperatures between 50° and 100° C., whereby the padding liquor may contain alkali and electrolytes.

The dyeings and prints obtained by the process of the present invention possess very good fastness properties, particularly a good fastness to wet processing and to light.

The following examples serve to illustrate the invention but they are not intended to limit it thereto, the parts being by weight unless otherwise stated and the relationship of parts by weight to parts by volume being the same as that of kilogram to the liter.

Example 1

18.4 parts of cyanuric chloride are dissolved in 100 parts of acetone and the clear solution is poured, while stirring, onto 400 parts of crushed ice. At that temperature ranging from 0° to +5° C. a solution of 28.1 parts of 1-aminobenzene-3-β-hydroxyethylsulfone-sulfuric acid ester and 19 parts of crystallized sodium acetate in 300 parts of water and a solution of 14 parts of crystallized sodium acetate in 100 parts of water are introduced simultaneously while vigorously stirring. Stirring is continued for 1 to 2 hours until a withdrawn sample contains no more diazotizable material. Subsequently a neutral solution of 23.9 parts of 2-amino-5-hydroxynaphthalene-7-sulfonic acid and 5.5 parts of sodium carbonate free from water in 250 parts of water is introduced and 18 parts of crystallized sodium acetate are added. The temperature is gradually raised to room temperature and the mixture is stirred for about 20 hours. After the addition of a further 40 parts of crystallized sodium acetate, coupling to form the monoazo dyestuff is carried out at room temperature with the diazonium compound prepared in the usual manner from 17.3 parts of 1-aminobenzene-2-sulfonic acid. After stirring for several hours the separation of the dyestuff is completed by the addition of sodium chloride; it is suction filtered off and dried at 50° C. The dyestuff obtained in the form of a dark powder dissolves in water to give an orange solution. In the form of its free acid it corresponds to the following formula

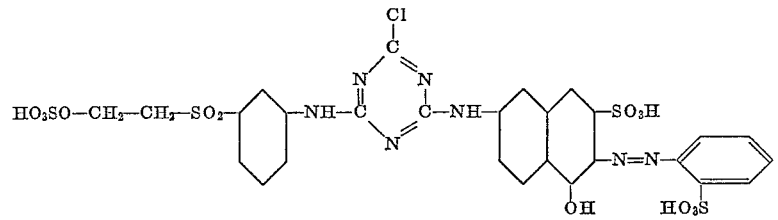

100 parts of cotton yarn are dyed for 30 minutes at 40° C. in 3000 parts by volume of a bath containing in dissolved form 5 parts of the dyestuff described above having a content of pure substance of 50% and 150 parts of sodium sulfate free from water. Subsequently 45 parts of crystallized trisodium phosphate are added to the dyeing bath and the dyeing is continued for 1½ hours. The material is then rinsed and soaped at boiling temperature. The orange dyeing obtained possesses a good fastness to wet processing and to light.

Example 2

20 parts of the dyestuff obtainable in an analogous manner as described in Example 1 with the use of 1-amino-8-hydroxynaphthalene-3,6-disulfonic acid, and which dyestuff corresponds in the form of its free acid to the following formula

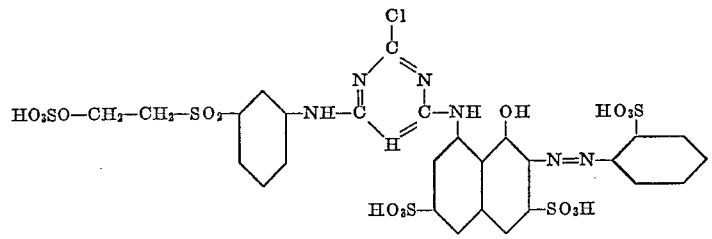

are dissolved in water. 10 parts by volume of sodium hydroxide solution of 38° Bé. are added and the whole is madeup to 1000 parts by volume by the addition of water. In the dyeing bath so obtained cotton fabric is impregnated at 20° C. The fabric is then squeezed off to an increase of weight of about 80%, rolled on a roller, wrapped in a foil and left on the roller while turning the latter for about 16 hours at a temperature between 18° and 25° C. The dyeing is then acidified, rinsed in boiling water and dried. A clear red dyeing possessing a good fastness to wet processing and to light is obtained.

Example 3

100 parts of linen fabric are dyed on a jigger for 30 minutes at 60° C. in 500 parts by volume of a liquor containing 25 parts of sodium sulfate and 5 parts of a dyestuff having a content of pure substance of 50% and corresponding in the form of its free acid to the following formula

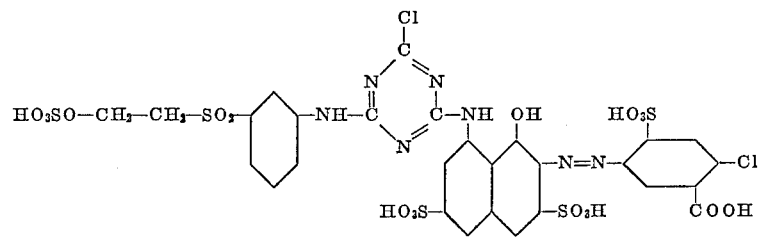

Subsequently 10 parts of sodium carbonate free from water are added to the dye bath and dyeing is continued for 1 hour. After acidifying, rinsing and soaping at boiling temperature, a clear red dyeing possessing very good fastness properties is obtained.

Example 4

100 parts of cotton fabric are dyed for 30 minutes at 60° C. in 3000 parts by volume of a liquor containing in dissolved form 5 parts of dyestuff obtainable in a similar manner as described in Example 1, which dystuff corresponds to the following formula

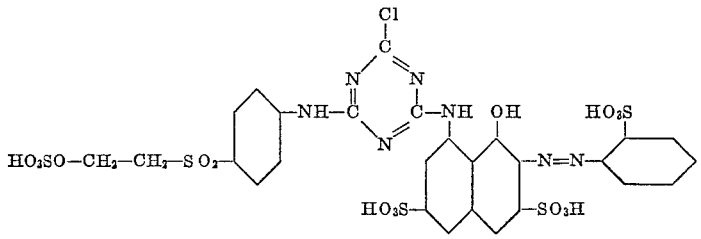

and 150 parts of sodium sulfate free from water. Subsequently 60 parts of sodium carbonate free from water are added to the dye bath and dyeing is continued for 1 hour. After rinsing and soaping at boiling temperature, a clear red dyeing possessing a very good fastness to washing and to light is obtained.

4 N-sodium acetate solution and the solution is stirred until the coupling is complete. The solution is heated to 40° C. and the dyestuff is salted out by the addition of 150 parts of potassium chloride, suction filtered off and dried. The dyestuff obtained in the form of a dark blue powder dissolves in water to give a yellow-red solution and corresponds in the form of its free acid to the following formula

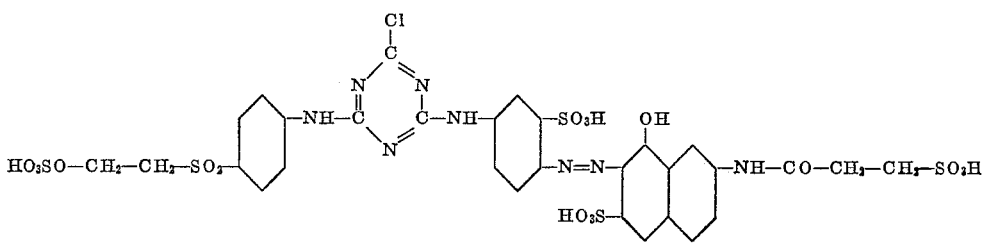

Example 5

18.8 parts of 1,4-diaminobenzene-2-sulfonic acid are dissolved in 400 parts of water with about 7 parts of sodium carbonate free from water and clarified. 20 parts of crystallized sodium acetate are then added and at 0° to +5° C. a solution of 18.4 parts of cyanuric chloride in 100 parts of acetone is added dropwise while stirring well, whereby a suspension forms. The pH-value of 5 is maintained by adding dropwise a 4 N-sodium acetate solution and the mixture is stirred for 2 hours at 0° to +5° C. After separation of the ice bath, 20 parts of crystallized sodium acetate are introduced and a suspension of 28.1 parts of 1-aminobenzene-4-β-hydroxyethylsulfone-sulfuric acid ester in 300 parts of water is poured in at room temperature. The pH-value of 5 is again maintained by adding dropwise a 4 N-sodium acetate solution and the mixture is stirred for about 20 hours at room temperature, whereby all its constituents are dissolved. Subsequently the solution obtained is cooled to 0° to +3° C., 30 parts of concentrated hydrochloric acid are added, and by adding dropwise about 20 parts by volume of 5 N-sodium nitrite solution it is diazotized. The acid is then saturated with 100 parts by volume of 4 N-sodium acetate solution, a clarified solution and of 37.5 parts of 2-(β-sulfopropionyl)-amino-8-hydroxynaphthalene-6-sulfonic acid and 7 parts of sodium carbonate free from water in 250 parts of water is added dropwise. The pH-value of 4.5 is maintained by adding dropwise about 50 parts by volume of Linen fabric is padded with a solution containing 30 grams/liter of the above-mentioned dyestuff having a content of pure substance of 50%. After squeezing off, an intermediate drying follows. Then the mixture is slop-padded with a solution containing 200 grams/liter of sodium sulfate free from water and 20 grams/liter of sodium hydroxide solution of 38° Bé. The material is squeezed off and steamed for 20 to 30 seconds at 100 to 105° C. The ruby red dyeing possesses very good fastness properties.

Example 6

Mercerized cotton fabric is padded with a solution containing 30 grams/liter of the dyestuff having a content of pure substance of 50% prepared in a similar manner as described in Example 5 and corresponding to the following formula

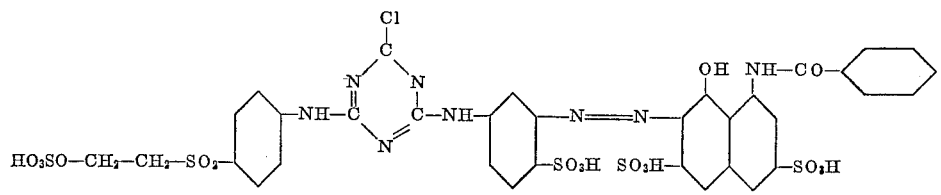

After squeezing off to an increase of weight of 80%, the material is subjected to an intermediate drying. It is then treated for 40 minutes at 70° C. on the jigger with a solution containing 300 grams/liter of sodium chloride and 30 grams/liter of crystallized trisodium phosphate. After acidifying, rinsing and soaping at boiling temperature, a clear bluish red dyeing possessing very good fastness properties is obtained.

A dyeing possessing a similar tint and similar fastness properties is obtained by using the dyestuff which contains as coupling component the 1-benzoylamino-8-hydroxynaphthalene-4,6-disulfonic acid instead of the corresponding 3,6-disulfonic acid.

Example 7

Staple fiber fabric is padded with a solution containing 30 grams/liter of the following dyestuff

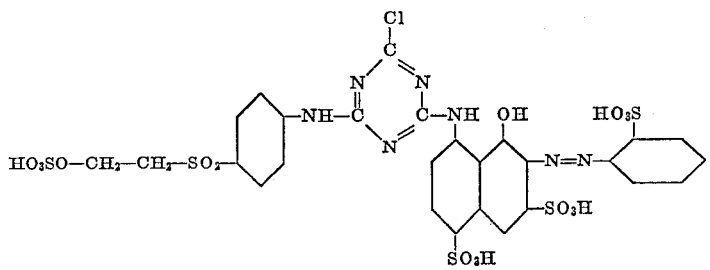

having a content of pure substance of about 60%, 100 grams/liter of urea, 10 grams/liter of the sodium salt of metanitrobenzene-sulfonic acid and 20 grams/liter of sodium bicarbonate. The material is squeezed off and dried. It is then steamed for 5 minutes at 100° to 105° C., rinsed and soaped at boiling temperature. A clear red dyeing possessing a very good fastness to wet processing and a good fastness to light is obtained.

Example 8

28.2 parts of 1-aminobenzene-4-β-hydroxyethylsulfone-sulfuric acid ester are neutralized at 10° to 15° C. while stirring in 150 parts of water by the addition of little more than 10 parts of potassium bicarbonate. The solution is then heated in 50° C. and clarified. 150 parts of ice are added to the filtrate and 18.4 parts of cyanuric chloride are introduced. The mixture is then stirred for several hours at 0° to +5° C. until a sample which has been admixed with hydrochloric acid and sodium nitrite no longer shows a coupling reaction with 2-naphthol-3,6-disulfonic acid. By adding dropwise about 40 parts of a potassium bicarbonate solution of 25% strength, the neutral point is adjusted again. Then 25 parts of 2-amino-8-hydroxy-naphthalene-6-sulfonic acid of 96% strength are added, the mixture is once more neutralized by adding potassium bicarbonate and heated to 40° to 45° C. The mixture is stirred for several hours at that temperature and the pH value is maintained at about 4 by slowly adding dropwise a potassium bicarbonate solution of 25% strength until it is no longer possible to prove diazotizable content. At the end of the reaction, the neutral point is adjusted again. The secondary condensation product which has been precipitated by the addition of 80 parts of potassium chloride is separated and dissolved in 600 parts of water. After the addition of 25 parts of potassium acetate free from water, 20 parts of the diazo-oxide of 2-aminophenol-4-sulfonic acid are introduced and the mixture is stirred at room temperature until the coupling is complete. By the addition of potassium chloride the dyestuff is salted out and suction filtered off. It is then dissolved in 1500 parts of water and, after the addition of 25 parts of crystallized copper sulfate and 55 parts of crystallized sodium acetate, heated for about 3 hours at 80° C. while stirring. After cooling, the complex copper dyestuff is precipitated with sodium chloride, suction filtered off and dried. It is a dark powder which dissolves in water to give a ruby red solution. In the form of its free acid the dyestuff corresponds to the following formula

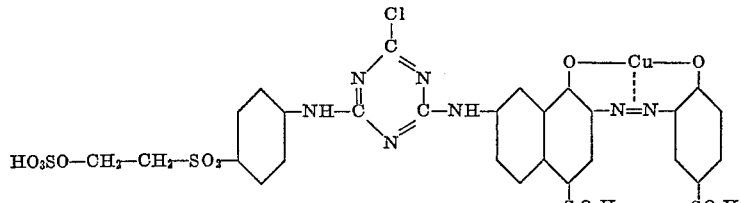

30 parts of this dyestuff having a content of pure substance of about 50% are dissolved with 50 parts of urea in 200 parts of hot water. After cooling, 400 parts of a thickening consisting of 40 parts of sodium aliginate and 960 parts of water and 20 parts of sodium bicarbonate are added while stirring. The paste is then made up to 1000 parts by adding water.

A cotton fabric is printed with the paste obtained; after drying it is steamed for 5 minutes at 101° to 103° C., rinsed with cold water, then with hot water, soaped at boiling temperature, rinsed again and dried. A ruby print possessing a good fastness to wet processing and to light is obtained.

With the complex cobalt dyestuff obtained by treating the starting dyestuff with an agent yielding cobalt, a currant print is obtained.

Example 9

The dyestuff having the following formula

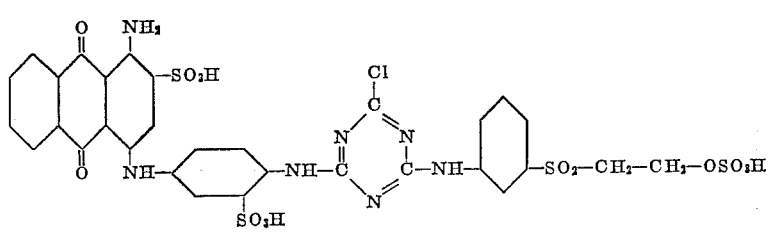

which is obtainable by reacting the condensation product of 1-amino-4-bromoanthraquinone-2-sulfonic acid and 1 mol of 1,4-diaminobenzene-2-sulfonic acid with the condensation product of cyanuric chloride and 1 mol of 1-aminobenzene-3-β-hydroxyethylsulfone-sulfuric acid ester, is printed on viscose rayon fabric in the same manner as described in Example 7. A greenish blue print possessing very good fastness properties is obtained.

*Example 10*

30 parts of a dyestuff which is obtainable by reacting copper phthalocyanine-tetrasulfochloride with the condensation product of cyanuric chloride, 1 mol of 1-aminobenzene-4-β-hydroxyethylsulfone-sulfuric acid ester and 1 mol of 1,4-diaminobenzene-2-sulfonic acid, and which corresponds to the following formula

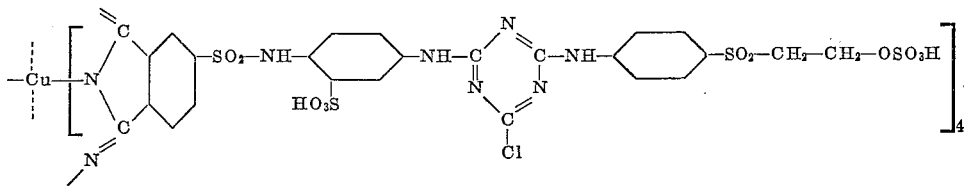

are dissolved with 50 parts of urea in 200 parts of hot water. 400 parts of an aqueous starch ether thickening of 10% strength and 40 parts of trisodium phosphate are then added. The paste obtained is made up to 1000 parts by adding water and thickening. After printing, fixing and finishing in the manner described in Example 8, turquoise blue prints possessing a good fastness to washing are obtained on cellulose fabrics or on fabrics of regenerated cellulose.

*Example 11*

40 parts of the dyestuff having the following formula

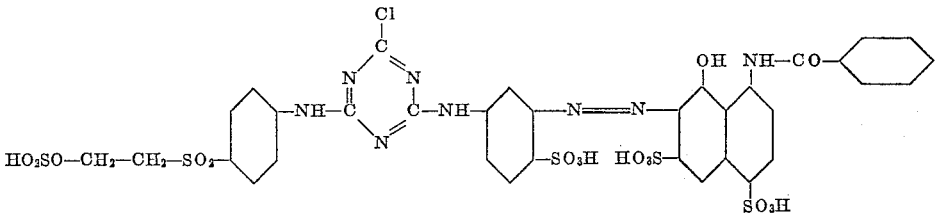

are dissolved by heating with 50 parts of urea in 250 parts of water. This solution is introduced while stirring into 400 parts of a neutral sodium alginate solution of 4% strength and the solution so obtained is then made up to 1000 parts by adding water and thickening. The printing color obtained is printed on cellulose fabric. After printing and drying, the material is passed through a cold padding liquor containing per liter of liquor 20 parts of sodium hydroxide solution of 38° Bé., 150 parts of sodium carbonate, 50 parts of potassium carbonate and 100 parts of sodium chloride. Subsequently the material is steamed for 30 seconds at 118° to 120° C. on a rapid ager. After finishing in the usual manner, a brilliant red print is obtained.

Fixation of the printed material may also be carried out by passing the material through a padding liquor of the above-mentioned composition at about 80° C., and then rinsing and soaping. A similar result is obtained as by proceeding in the manner described earlier above.

*Example 12*

Cotton is padded with a liquor containing 10 cc./l. of sodium hydroxide solution of 38° Bé. and, after drying, printed with a printing paste having the composition described in Example 11. Fixation is carried out by steaming for 5 minutes at 101° to 103° C. in a usual "Mather Platt." After rinsing and soaping a fast brilliant red print is obtained.

*Example 13*

40 parts of the dyestuff described in Example 7 are dissolved with 50 parts of urea in 250 parts of hot water. This solution is introduced, while stirring, into 400 parts of a neutral sodium alginate thickening of 4% strength. After cooling the printing color, 20 parts of sodium acetate are added; subsequently the solution obtained is made up to 1000 parts by adding water or thickening. With this printing paste, silk is printed. Fixation is carried out in the usual manner by steaming. Brilliant red prints possessing a good fastness to wet processing are obtained.

*Example 14*

40 parts of the dyestuff described in Example 7 are dissolved with 50 parts of urea in 250 parts of hot water. This solution is introduced while stirring into 400 parts of a neutral sodium alginate thickening of 4% strength; subsequently 100 parts of a solution of the sodium salt of trichloroacetic acid in water (1:1) are added and the solution obtained is made up to 1000 parts by adding water and thickening. With this printing color, brilliant red prints possessing a good fastness to wet processing are obtained on wool after fixing by steaming.

*Example 15*

100 parts of a polyamide fabric are treated for about 10 minutes at 40° C. in 3000 parts by volume of a liquor containing in dissolved form 2 parts of the dyestuff described in Example 7 and 6 parts of crystallized trisodium phosphate. The dye bath is then acidified by adding formic acid, acetic acid or sulfuric acid and the material is dyed for 1 hour at boiling temperature. A scarlet dyeing possessing a high brilliancy and very good fastness properties is obtained.

*Example 16*

100 parts of combed wool material are treated for about 10 minutes at 40° C. in 1000 parts by volume of a liquor containing in dissolved form 7 parts of acetic acid of 50% strength and 10 parts of sodium sulfate free from water. After the addition of a concentrated aqueous solution which contains 2 parts of the dyestuff corresponding to the following formula

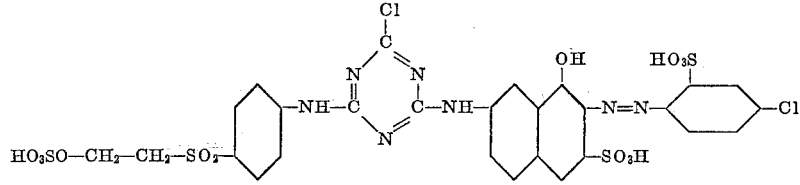

having a content of pure substance of 50% and which, after the addition of 2 parts of crystallized trisodium phosphate has been left for 10 minutes at 40° C. in the alkaline range, the bath is heated to boiling temperature and the material is dyed for 1 hour at this temperature. It is then rinsed and treated for 30 minutes at 80° C. in 1500 parts by volume of a new bath containing 3 parts of dissolved disodium phosphate, and rinsed again. A scarlet dyeing possessing very good fastness properties is obtained.

Dyeings and prints possessing good fastness properties are obtained in a similar manner as described in the previous examples by using the dyestuffs listed in the following table.

| Composition | Tint |
|---|---|
| 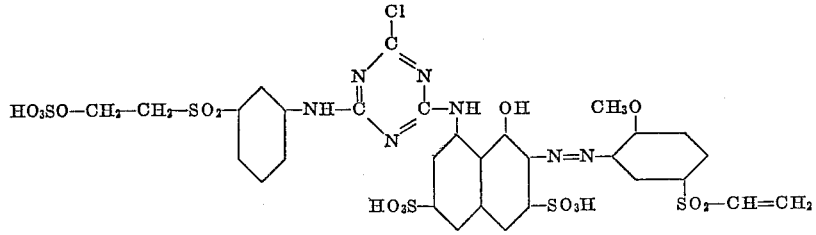 | bluish red. |
| 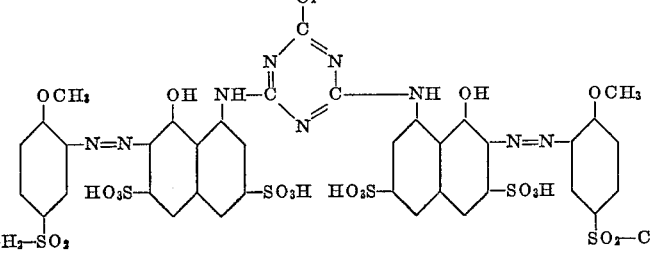 | Do. |
| 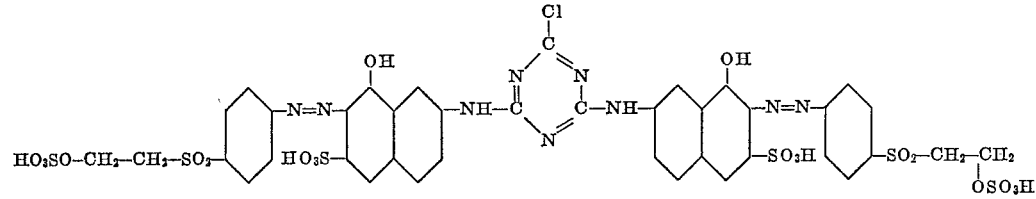 | yellowish red. |
| 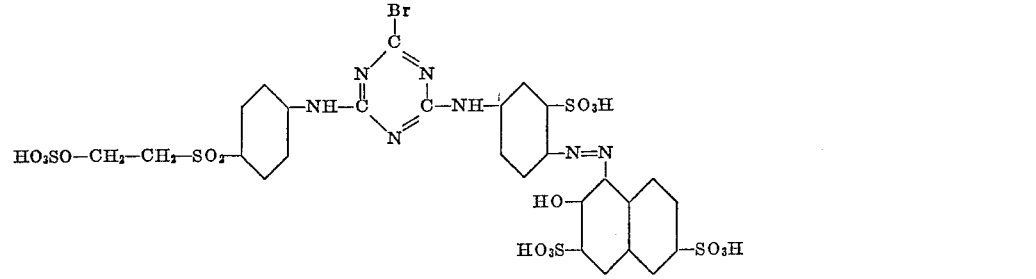 | bluish red. |
| 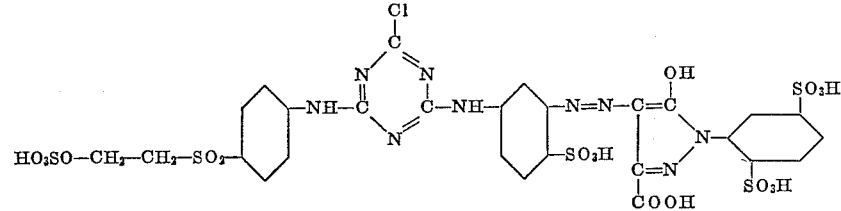 | greenish yellow. |
| 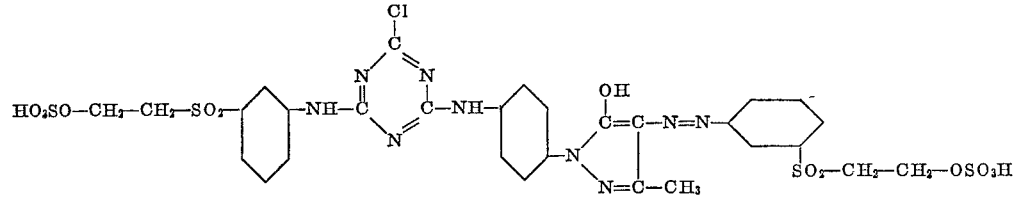 | yellow. |

| Composition | Tint |
|---|---|
| 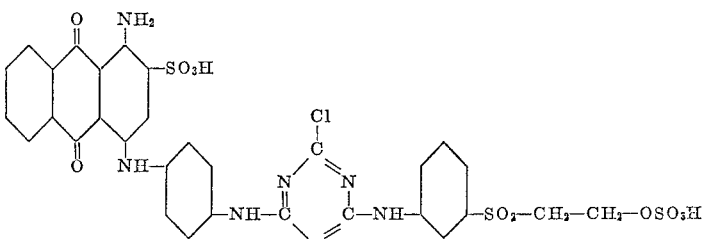 | blue. |
| 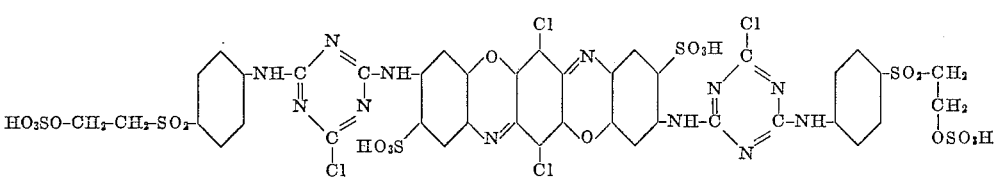 | blue violet. |

We claim:

1. In a process for dyeing fibrous articles of a material selected from the group consisting of natural cellulose, regenerated cellulose, wool, silk and polyamides, the improvement which comprises applying to said fibrous articles a water-soluble organic dyestuff selected from the group consisting of azo-, complex metal azo-, phthalocyanine, complex metal phthalocyanine, anthraquinone, and dioxazine dyestuffs, said dyestuffs containing 1 to 4 radicals selected from the group consisting of

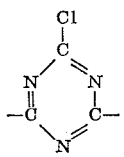

and

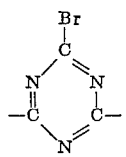

and 1 to 4 substituents selected from the group consisting of $-SO_2-CH=CH_2$, $-SO_2-CH_2-CH_2-Cl$, $-SO_2-CH_2-CH_2-OSO_3H$ and $-SO_2-CH_2-CH_2-O-PO(OH)_2$ and an alkaline agent.
$(OH)_2$, and an alkaline agent.

2. A process as defined in claim 1 wherein the alkaline agent is applied after the dyestuff.

3. A process as defined in claim 1 wherein the alkaline agent is applied simultaneously with the dyestuff.

4. A process as defined in claim 1 wherein the alkaline agent is applied before the dyestuff.

5. A process as defined in claim 1 wherein the alkaline agent used is a member of the group consisting of sodium hydroxide, sodium carbonate, sodium bicarbonate, trisodium phosphate and sodium trichloroacetate.

References Cited by the Examiner

UNITED STATES PATENTS 3,046,075   7/1962   Kantner et al. _____ 8—1.2

FOREIGN PATENTS 1,252,324   12/1960   France.
111,302   12/1961   Pakistan.

NORMAN G. TORCHIN, *Primary Examiner.*
ABRAHAM H. WINKELSTEIN, *Examiner.*